United States Patent [19]

Wakabayashi et al.

[11] Patent Number: 5,487,386

[45] Date of Patent: Jan. 30, 1996

[54] ULTRASONIC DIAGNOSTIC APPARATUS

[75] Inventors: Naoto Wakabayashi; Masayoshi Tsuchiko; Terufumi Akama, all of Tochigi; Hiromi Maekawa, Ootawara; Hiroyuki Shikata, Tochigi; Nobuo Yamazaki; Tomio Kawaguchi, both of Ootawara, all of Japan

[73] Assignee: Kabushiki Kaisha Toshiba, Kawasaki, Japan

[21] Appl. No.: 230,697

[22] Filed: Apr. 21, 1994

[30] Foreign Application Priority Data

Apr. 22, 1993 [JP] Japan .................................. 5-095847

[51] Int. Cl.⁶ ....................................................... A61B 8/00
[52] U.S. Cl. ....................................................... 128/660.01
[58] Field of Search ........................ 128/660.01, 660.07; 364/413.25; 73/602

[56] References Cited

U.S. PATENT DOCUMENTS 5,315,512  5/1994  Roth ................................... 128/660.07

Primary Examiner—George Manuel
Attorney, Agent, or Firm—Oblon, Spivak, McClelland, Maier, & Neustadt

[57] ABSTRACT

An ultrasonic diagnostic apparatus transmits an ultrasonic wave to an object to be examined and forms an image of tomographic information in the object obtained through an ultrasonic probe. The apparatus measures a comulative operation time of the ultrasonic probe and output the cumulative operation time.

15 Claims, 10 Drawing Sheets

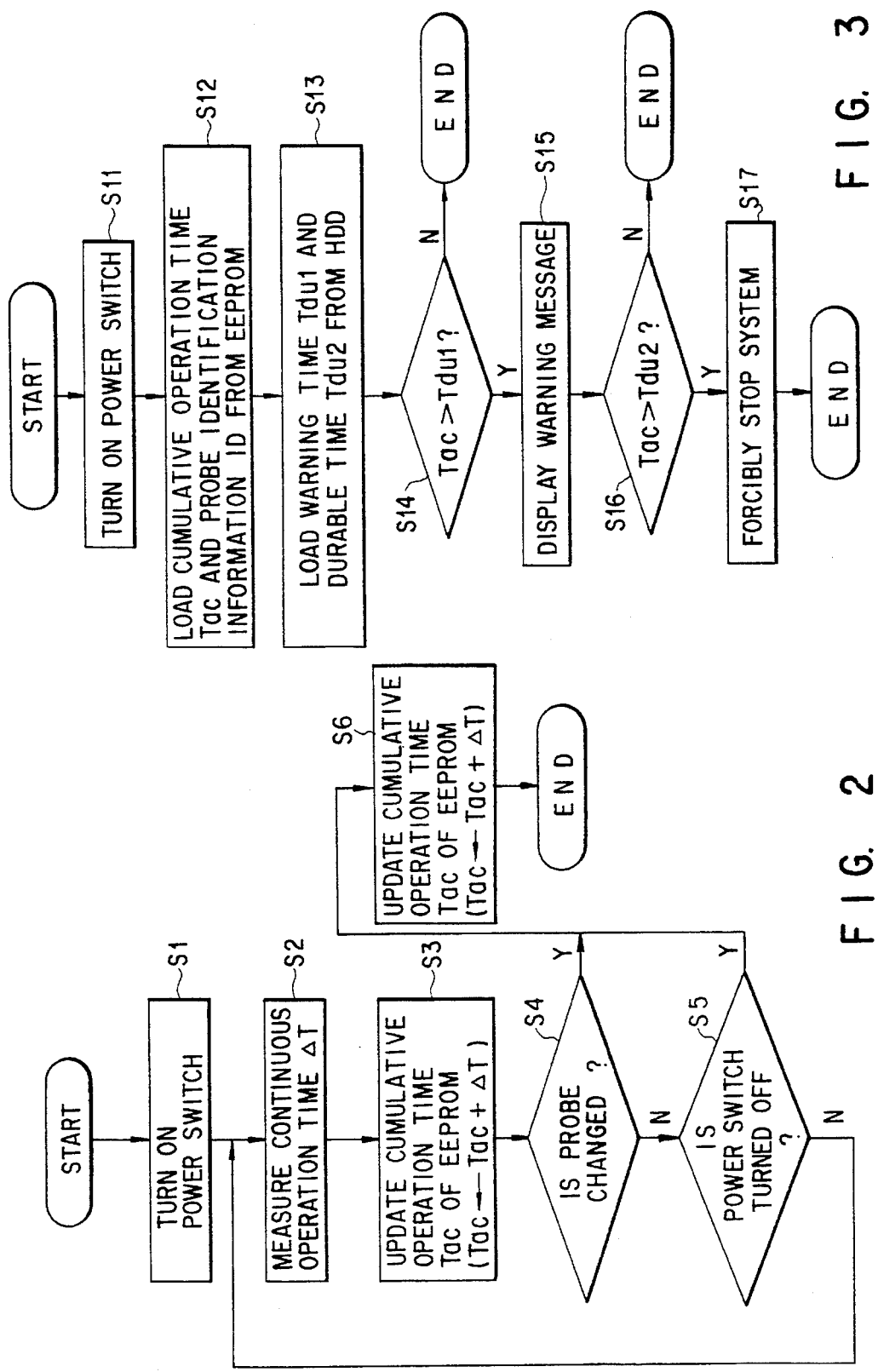

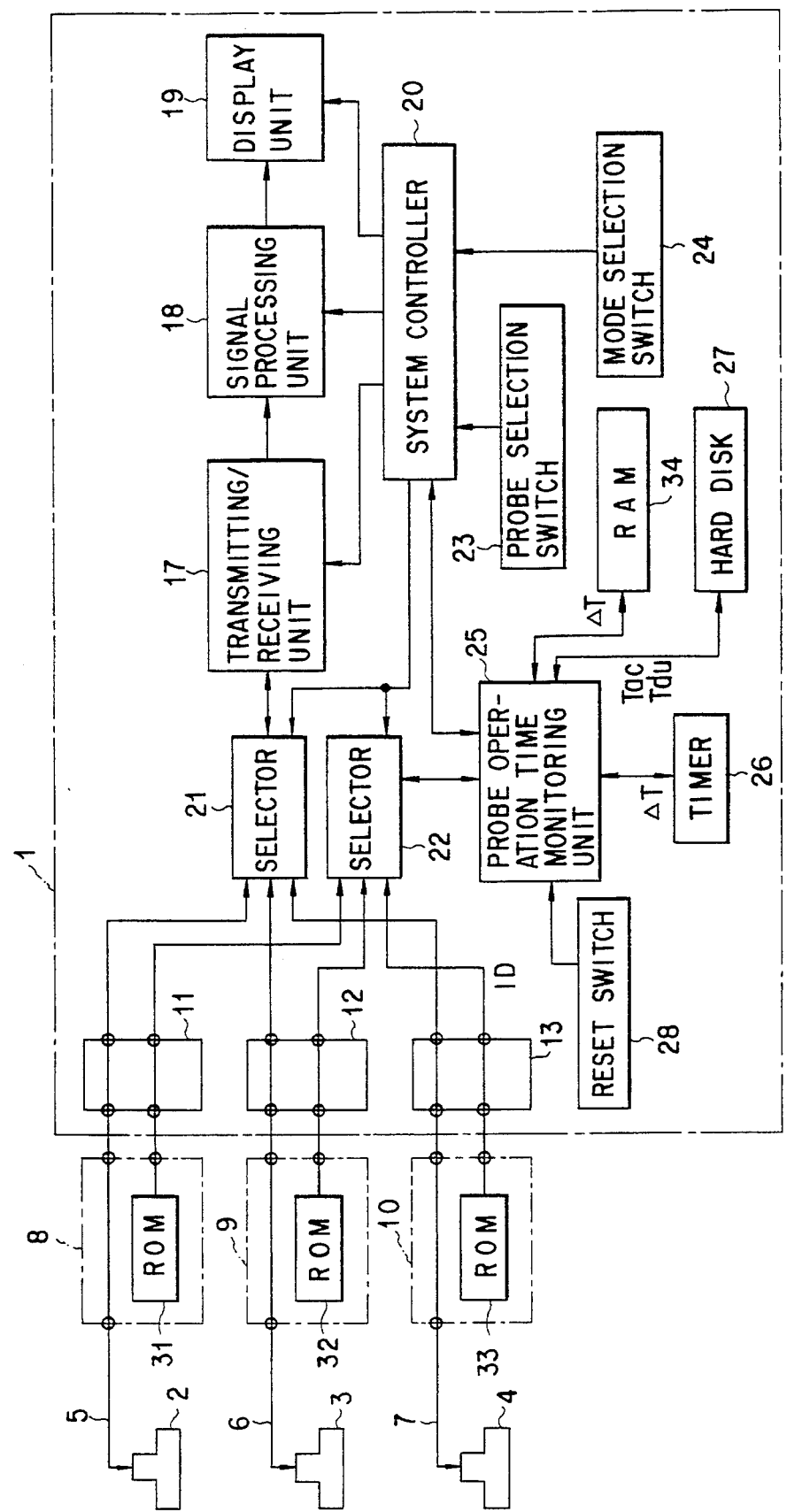
F I G. 4

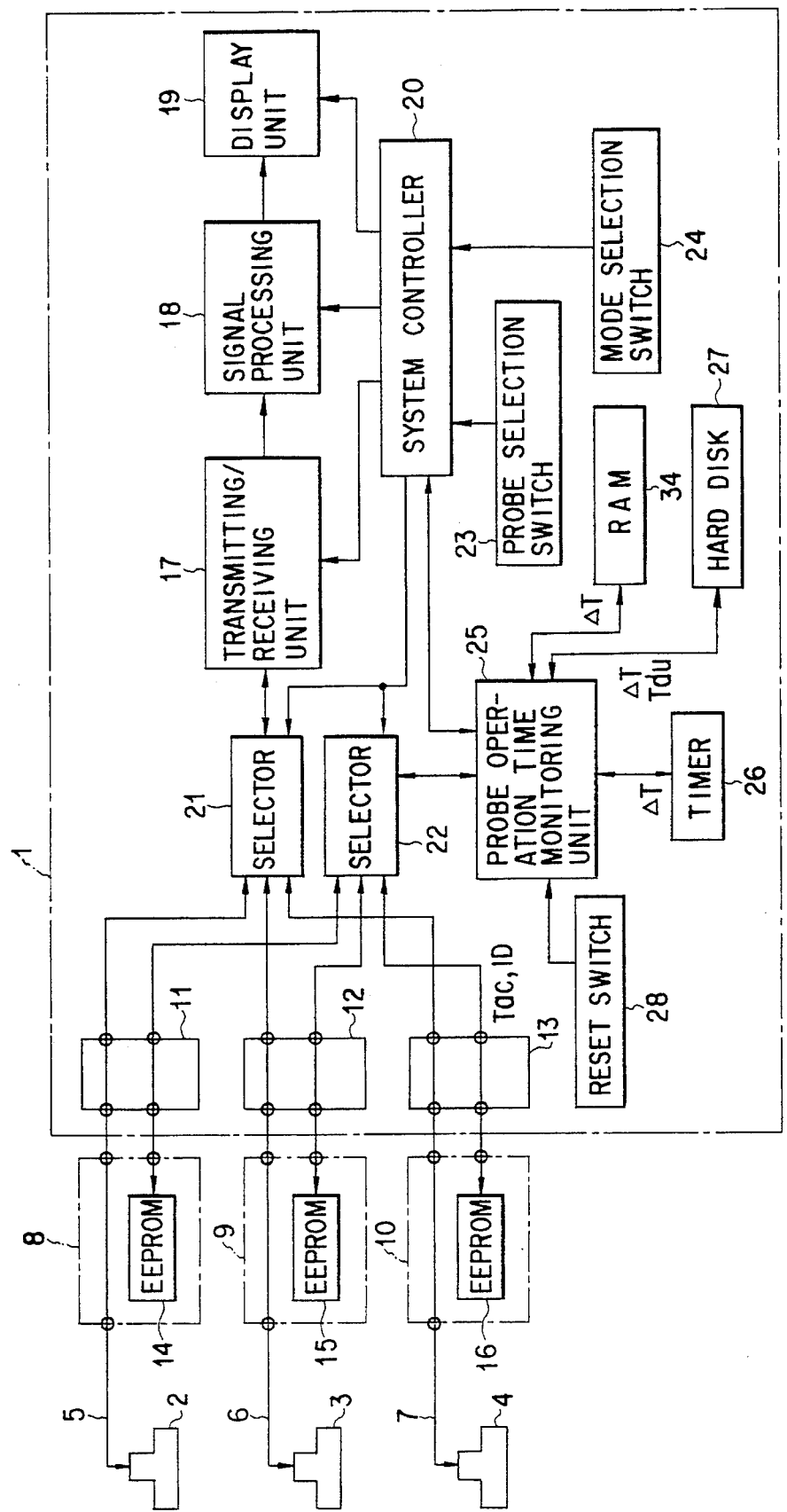
F I G. 7

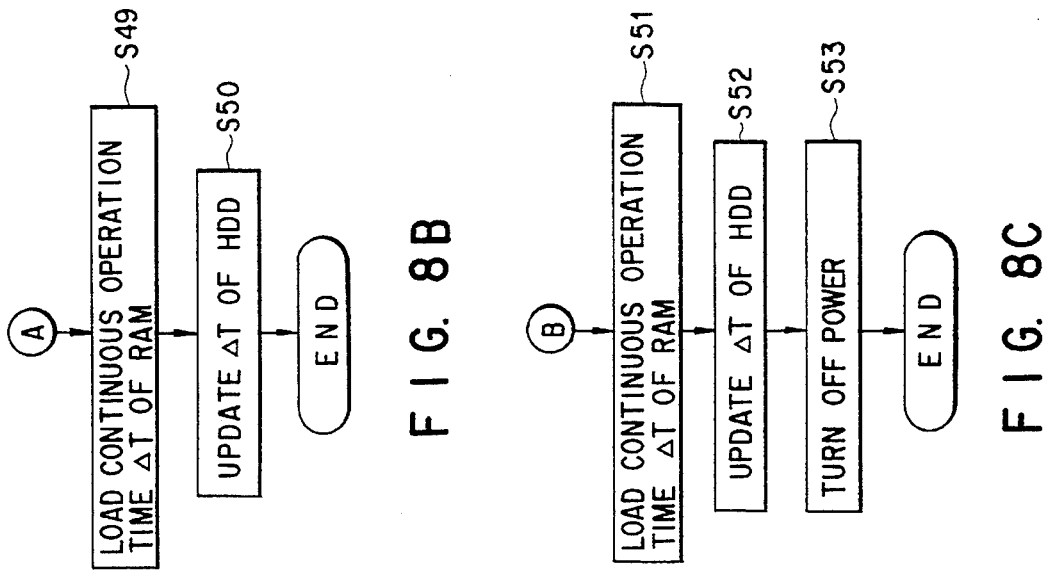
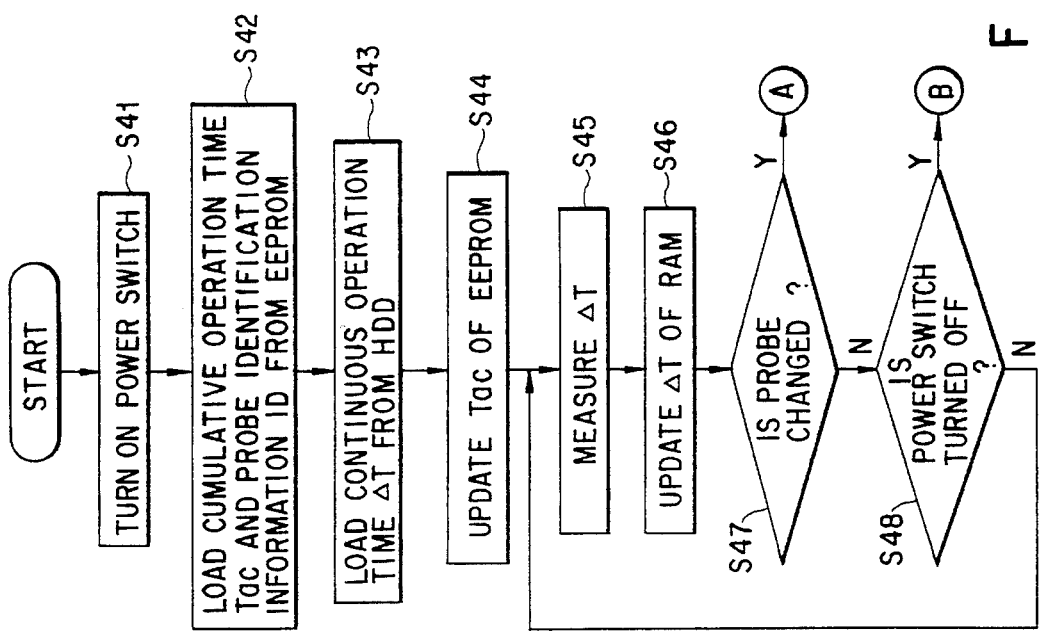

5,487,386

ULTRASONIC DIAGNOSTIC APPARATUS

BACKGROUND OF THE INVENTION

1. Field of the Invention

The present invention relates to an ultrasonic diagnostic apparatus in which the slice of an object to be examined is scanned with an ultrasonic beam through an ultrasonic probe to form the image of tomographic information in the object.

2. Description of the Related Art

When an ultrasonic probe is used for a long time, the sensitivity of the ultrasonic probe is gradually degraded. This degradation of sensitivity occurs when a piezoelectric material or an electrode material changes with time due to repetitive energizing operations. The quality of a tomographic image is degraded with degradation of the sensitivity of the ultrasonic probe, troubles occur in diagnoses in the future, and an erroneous diagnosis may be caused.

The quality assurance of ultrasonic probes is generally performed only when products are shipped. Since a degree of degradation of an ultrasonic probe considerably depends on frequencies at which a servicemen uses the ultrasonic probe, the degree of degradation cannot be recognized by only the number of days from the delivery of an ultrasonic diagnostic apparatus. Therefore, in a medical site, even when the quality of an ultrasonic probe is degraded, a servicemen may have used the ultrasonic diagnostic apparatus without knowing the degradation of the ultrasonic probe until image quality is considerably degraded or the operation time of the ultrasonic probe becomes equal to a durable time thereof not to obtain a normal image.

As described above, since a method of easily recognizing a degree of degradation of an ultrasonic probe has not been established, there is an inconvenience that a servicemen continuously uses an ultrasonic probe without knowing the degradation of the ultrasonic probe.

SUMMARY OF THE INVENTION

It is an object of the present invention to provide an ultrasonic diagnostic apparatus which objectively recognizes an operation time of an ultrasonic probe for transmitting and receiving an ultrasonic wave.

According to the present invention, there is provided an ultrasonic diagnostic apparatus for transmitting an ultrasonic wave to an object to be examined and causing an apparatus main body to form an image of tomographic information in the object obtained through an ultrasonic probe for receiving a wave reflected by the body, comprising: storage means for storing a cumulative operation time of said ultrasonic probe; probe operation time monitoring means for measuring a continuous operation time of said ultrasonic probe, and adding the measured continuous operation time to the cumulative operation time stored in said storage means to update the cumulative operation time stored in said storage means; and output means for outputting the updated cumulative operation time.

As described above, according to the present invention, a cumulative operation time of an ultrasonic probe is measured, and the cumulative operation time is output, so that an operation time of the ultrasonic probe can be recognized objectivity.

Therefore, the ultrasonic diagnostic apparatus according to the present invention can urge a servicemen to exchange an ultrasonic probe whose operation time exceeds the durable time of the ultrasonic probe or to repair the ultrasonic probe, and the servicemen does not inconveniently perform a diagnosis without knowing degradation of image quality caused by degradation of the ultrasonic probe.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a flow chart showing an updating operation for a cumulative operation time in the first embodiment;

FIG. 3 is a flow chart showing an operation time monitoring operation in the first embodiment;

FIG. 4 is a block diagram showing the arrangement of an ultrasonic diagnostic apparatus according to the second embodiment of the present invention;

FIG. 7 is a block diagram showing the arrangement of an ultrasonic diagnostic apparatus according to the third embodiment of the present invention;

FIGS. 8A to 8C are flow charts showing an updating operation for a cumulative operation time in the third embodiment;

DETAILED DESCRIPTION OF THE PREFERRED EMBODIMENTS

Embodiments of ultrasonic diagnostic apparatuses according to the present invention will be described below with reference to the accompanying drawings.

First Embodiment

Figure 1:
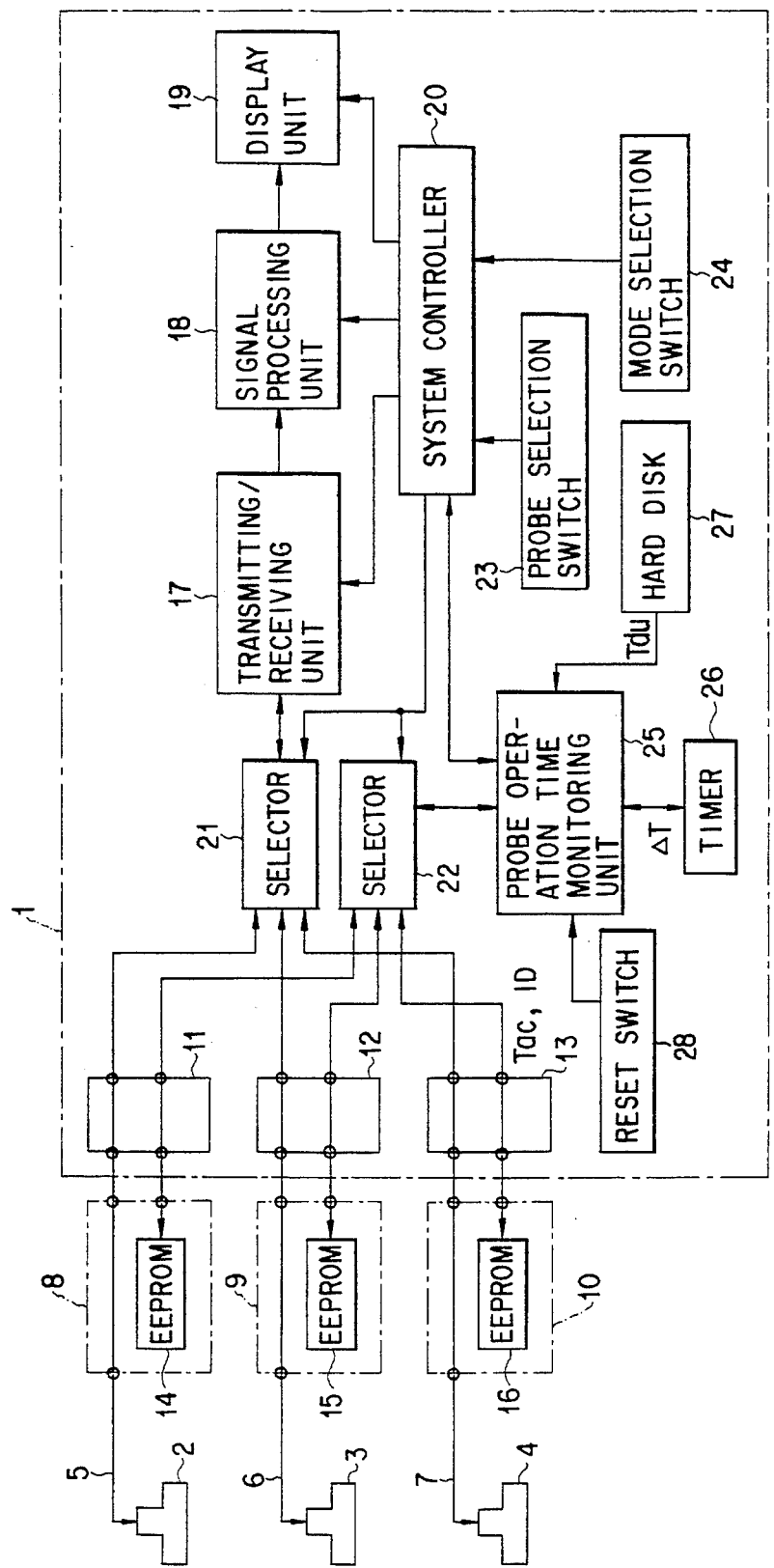
FIG. 1 is a block diagram showing the arrangement of an ultrasonic diagnostic apparatus according to the first embodiment of the present invention.

FIG. 1 is a block diagram showing the arrangement of the first embodiment of the present invention. A plurality of (the maximum number is three in this embodiment) ultrasonic probes (to be referred to as probes hereinafter) 2, 3, and 4 are detachably connected to an apparatus main body 1. Each of the probes 2, 3, and 4 is constituted by a large number of piezoelectric elements arranged in a line (piezoelectric element array), transmits an ultrasonic wave to an object to be examined, and receives a wave reflected by the object. Note that each of the probes 2, 3, and 4 has a structure in which a piezoelectric element array is exchangeable.

In the probes 2, 3, and 4, probe connectors (male) 8, 9, and 10 are fixedly connected to the probes 2, 3, and 4 through cables 5, 6, and 7, respectively. The probe connectors (male) 8, 9, and 10 are detachably coupled to a plurality of connectors (female) 11, 12, and 13 arranged in the apparatus main body 1, respectively.

EEPROMs (Electrical Erasable Programmable Read Only Memories) 14, 15, and 16 are incorporated in the probe connectors 8, 9, and 10, respectively. As the EEPROMs 14, 15, and 16, semiconductor memories capable of storing storage contents without receiving an external power may be used. For example, the EEPROMs 14, 15, and 16 may be replaced with RAMs (Random Access Memories) each having a backup power supply. Cumulative operation times Tac of the probes 2, 3, and 4 and pieces of probe identification information ID inherent in the probes 2, 3, and 4 and corresponding to the cumulative operation times Tac are stored in the EEPROMs 14, 15, and 16, respectively.

In the apparatus main body 1, a transmitting/receiving unit 17 for transmitting/receiving an ultrasonic wave through one of the probes 2, 3, and 4, a signal processing unit 18 for forming the image of a reflected wave signal received by the transmitting/receiving unit 17, a display unit 19 for displaying the image (a B mode image, an M mode image, a CFM mode image, or the like) obtained by the signal processing unit 18, and a system controller 20 for controlling the entire apparatus are arranged.

The apparatus main body 1 includes a probe selection switch 23 used when a servicemen selects one of the probes 2, 3, and 4, a selector 21 for selectively connecting one of the probes 2, 3, and 4 selected by the probe selection switch 23 to the transmitting/receiving unit 17, and a mode selection switch 24 used when a serviceman selects one of operation modes, e.g., a B mode, an M mode, and a CFM mode (Color Flow Mapping mode in which the color image of a movable medium, mainly a blood flow, is formed using a frequency deviation obtained by the Doppler effect).

The apparatus main body 1 also includes a probe operation time monitoring unit 25, a selector 22 for selectively connecting, to the probe operation time monitoring unit 25, the EEPROM 14, 15, or 16 corresponding to the probe 2, 3, or 4 selected through the probe selection switch 23, a timer 26, a hard disk drive 27, and a reset switch 28 used when a serviceman intentionally resets the cumulative operation time Tac of the EEPROM 14, 15, or 16 to be 0.

As the timer 26, a counter for repetitively outputting a pulse at, e.g., a predetermined period (e.g., one second or one minute) or a clock for continuously outputting the current time may be used. Durable times Tdu2 (e.g., 15,000 hours) respectively inherent in the probes 2, 3, and 4 and warning times Tdu1 (e.g., 10,000 hours) respectively inherent in the probes 2, 3, and 4 and respectively shorter than the durable times Tdu2 are stored in the hard disk drive 27 in correspondence with the pieces of probe identification information ID of the probes 2, 3, and 4 in advance.

The probe operation time monitoring unit 25 has the following functions.

(a) The probe operation time monitoring unit 25 has a function of measuring continuous operation times $\Delta T$ of the probes 2, 3, and 4 through the timer 26. When a counter is used as the timer 26, the continuous operation time $\Delta T$ is measured on the basis of a pulse count output from the timer 26 within a time interval in which the probe 2, 3, or 4 selected by the probe selection switch 23 is driven (energized) by the transmitting/receiving unit 17. When a timepiece is used as the timer 26, the continuous operation time $\Delta T$ is measured on the basis of the start and end times of the above time interval. Therefore, the continuous operation time $\Delta T$ is measured as the continuous energizing time of each probe.

Note that the continuous operation time $\Delta T$ is not limited to the continuous energizing time, and another type of time, e.g., a continuous selection time in which the same probe is continuously selected may be used as the continuous operation time $\Delta T$. In this case, the probe operation time monitoring unit 25 receives a select signal supplied from the system controller 20 to the selector 21, and measures the continuous operation time $\Delta T$ through the timer 26 on the basis of this select signal.

As the continuous operation time $\Delta T$, a time interval in which the probe connector of one of the probes 2, 3, and 4 is continuously coupled to the apparatus main body 1 within a time interval in which the main power supply of the apparatus is set in an ON state may be used. In this case, the probe operation time monitoring unit 25 measures the time interval as a time interval from when the probe operation time monitoring unit 25 loads the probe identification information ID from the EEPROM in the corresponding probe connector to when the corresponding probe connector is detached from the apparatus main body 1.

(b) The probe operation time monitoring unit 25 has a function of loading the identification information ID from the EEPROM 14, 15, or 16.

(c) The probe operation time monitoring unit 25 has a function of loading the cumulative operation time Tac from the EEPROM 14, 15, or 16.

(d) The probe operation time monitoring unit 25 has a function of selectively loading, from the hard disk drive 27, the durable time Tdu2 and warning time Tdu1 corresponding to the probe identification information ID loaded from the EEPROM 14, 15, or 16.

(e) The probe operation time monitoring unit 25 has a function of adding the measured continuous operation time $\Delta T$ to the cumulative operation time Tac loaded from the EEPROM 14, 15, or 16 and storing the sum in the corresponding one of the EEPROMs 14, 15, and 16 as a new cumulative operation time Tac. That is, the probe operation time monitoring unit 25 has a function of updating the cumulative operation time Tac of each of the EEPROMs 14, 15, and 16.

(f) The probe operation time monitoring unit 25 has a function of comparing the cumulative operation time Tac loaded from the EEPROM 14, 15, or 16 with the corresponding durable time Tdu2 and warning time Tdu1 to monitor the operation time of the corresponding one of the probes 2, 3, and 4.

(g) The probe operation time monitoring unit 25 has a function of, when the cumulative operation time Tac is equal to the warning time Tdu1, outputting data indicating that the cumulative operation time Tac is equal to the warning time Tdu1 to the system controller 20 to output (display) a warning message from the display unit 19.

(h) The probe operation time monitoring unit 25 has a function of, when the cumulative operation time Tac is equal to the durable time Tdu2, outputting data indicating that the cumulative operation time Tac is equal to the durable time Tdu2 to the system controller 20 to forcibly stop the entire operation of the ultrasonic diagnostic apparatus.

(i) The probe operation time monitoring unit 25 has a function of outputting data indicating the cumulative operation time Tac to the system controller 20 to display the cumulative operation time Tac on the display unit 19 in numerical values.

(j) The probe operation time monitoring unit 25 has a function of, when the reset switch 28 is depressed by a serviceman, resetting the cumulative operation time Tac stored in the EEPROM 14, 15, or 16 to be 0 hour. The serviceman depresses the reset switch 28 when a piezoelectric element array is replaced with a new one.

The operation of this embodiment will be described below. FIG. 2 is a flow chart showing an operation of updating the cumulative operation time Tac according to the first embodiment, and FIG. 3 is a flow chart showing an operation of monitoring operation time of a probe according to the first embodiment.

The updating operation for the cumulative operation time Tac will be described below. In step S1, the main power switch of the ultrasonic diagnostic apparatus is turned on by a serviceman. The probe operation time monitoring unit 25 measures the continuous operation time ΔT using function (a) described above.

In step S3, the cumulative operation time Tac stored in the EEPROM 14, 15, or 16 corresponding to a probe operated at present is updated on the basis of the continuous operation time ΔT. That is, the continuous operation time ΔT is added to the cumulative operation time Tac read out from the EEPROM 14, 15, or 16, and the sum is written in the EEPROM 14, 15, or 16 as a new cumulative operation time Tac. This updating operation is preferably performed when the probe 2, 3, or 4 does not transmit/receive an ultrasonic wave, e.g., when a mode is switched, to prevent noise from being mixed in a signal supplied from the probe 2, 3, or 4 to the transmitting/receiving unit 17.

This embodiment can also cope with a case wherein the probe 2, 3, or 4 in operation, the main power switch of the ultrasonic diagnostic apparatus is unexpectedly turned off (e.g., a power failure) while the continuous operation time ΔT is measured in step S2.

While the continuous operation time ΔT is measured in step S2, when the probe 2, 3, or 4 in operation is unexpectedly changed to another probe, YES is determined in step S4. In this manner, the operation in step S6 is executed, and the cumulative operation time Tac of the EEPROM 14, 15, or 16 is updated on the basis of the continuous operation time ΔT measured up to a time when the probe 2, 3, or 4 in operation is unexpectedly detached.

while the continuous operation time ΔT is measured in step S2, when the main power switch of the ultrasonic diagnostic apparatus is turned off, YES is determined in step S5. In this manner, the operation in step S3 is executed, and the cumulative operation time Tac of the EEPROM 14, 15, or 16 is updated on the basis of the continuous operation time ΔT measured up to a time when the main power switch of the ultrasonic diagnostic apparatus is unexpectedly turned off.

An operation of monitoring operation time of a probe will be described below with reference to FIG. 3. In step S11, the main power switch of the ultrasonic diagnostic apparatus is turned on by a serviceman. In step S12, the cumulative operation time Tac and the probe identification information ID from the EEPROM 14, 15, or 16 corresponding to the probe 2, 3, or 4 selected through the probe selection switch 23 are loaded into the probe operation time monitoring unit 25. The cumulative operation time Tac is supplied to the display unit 19 through the system controller 20 and displayed on a screen in accordance with an instruction input at any time from a console panel (not shown) of the apparatus main body by a serviceman or the serviceman.

In step S13, the warning time Tdu1 and durable time Tdu2 inherent in the probe 2, 3, or 4 selected through the probe selection switch 23 are loaded from the hard disk drive 27 into the probe operation time monitoring unit 25 on the basis of the probe identification information ID.

In step S14, the probe operation time monitoring unit 25 compares the cumulative operation time Tac with the warning time Tdu1. When the cumulative operation time Tac is shorter than the warning time Tdu1, the operation time monitoring operation is ended. When the cumulative operation time Tac is equal to the warning time Tdu1, data indicating that the cumulative operation time Tac is equal to the warning time Tdu1 is output from the probe operation time monitoring unit 25 to the system controller 20 in step S15. In this manner, a warning message is displayed on the display unit 19. As this warning message, a character message indicating that the cumulative operation time Tac is equal to the warning time Tdu1 may be displayed on the screen of the display unit 19, the cumulative operation time Tac may be directly displayed on the screen of the display unit 19 as numerical information using, e.g., flickered red light, or a certain type of tone may be generated by a tone generating unit (not shown). In addition, the warning message may be output by an arbitrary method.

In step S16, the probe operation time monitoring unit 25 compares the cumulative operation time Tac with the durable time Tdu2. When the cumulative operation time Tac is shorter than the durable time Tdu2, the operation time monitoring operation is ended. When the cumulative operation time Tac is equal to the durable time Tdu2, data indicating that the cumulative operation time Tac is equal to the durable time Tdu2 is output from the probe operation time monitoring unit 25 to the system controller 20. In this manner, in step S17, the system controller 20 forcibly stops the operation of the ultrasonic diagnostic apparatus.

Note that, when the serviceman replaces the piezoelectric array of the probe with a new one, the serviceman depresses the reset switch 28. The probe operation time monitoring unit 25 resets the cumulative operation time Tac stored in the EEPROM 14, 15, or 16 to be 0 hour.

As described above, according to this embodiment, the cumulation energizing time of a probe can be displayed at any time, so that a serviceman can objectivity recognize a degree of operation time of the probe. In addition, according to this embodiment, since the cumulation energizing time is stored in the EEPROM incorporated in the probe connector permanently connected to the probe, a problem which may be caused by detaching the probe from the apparatus main body, i.e., a problem that the cumulation energizing time of the probe cannot be continuously monitored by connecting the probe to another ultrasonic diagnostic apparatus, can be easily solved. According to this embodiment, degradation of the probe can be monitored using a warning time. When the cumulation energizing time exceed to the warning time, a warning message is transmitted to a serviceman to urge the serviceman to immediately replace the probe with a new one. According to this embodiment, operation time of the probe is monitored using a durable time. When the cumulation energizing time exceed to the durable time, the operation of the ultrasonic diagnostic apparatus is forcibly stopped to prevent degradation of diagnostic accuracy caused such that a user man performs diagnoses without knowing degradation of image quality caused by degradation of the probe.

Second Embodiment

FIG. 4 is a block diagram showing the arrangement of the second embodiment. The same reference numerals as in FIG. 1 denote the same parts in FIG. 4, and a detailed description thereof will be omitted.

In the first embodiment, a cumulative operation time Tac is stored in the EEPROM of a probe connector. However, in the second embodiment, unlike the first embodiment, the cumulative operation time Tac is stored in a hard disk drive 27 in an apparatus main body. The hard disk drive 27 has magnetic disks, can read and write electrically data.

For this reason, according to this embodiment, nonvolatile memories (ROM) 31, 32, and 33 are incorporated in probe connectors 8, 9, and 10, respectively, and only pieces of probe identification information ID of probes 2, 3, and 4 are stored in the ROMs 31, 32, and 33, respectively. In addition, an electrically erasable programmable RAM 34 is connected to a probe operation time monitoring unit 25. Pulse counts (or times) output from a timer 26 while a continuous operation time ΔT is measured are sequentially written in the RAM 34 by the probe operation time monitoring unit 25. According to this embodiment, durable times Tdu2 and warning times Tdu1 respectively inherent in the probes 2, 3, and 4 are written in the hard disk drive 27 in correspondence with the pieces of probe identification information ID of the probes 2, 3, and 4 in advance. Cumulative operation times Tac measured by the probe operation time monitoring unit 25 are written in the hard disk drive 27 in correspondence with the pieces of probe identification information ID.

Figure 5:
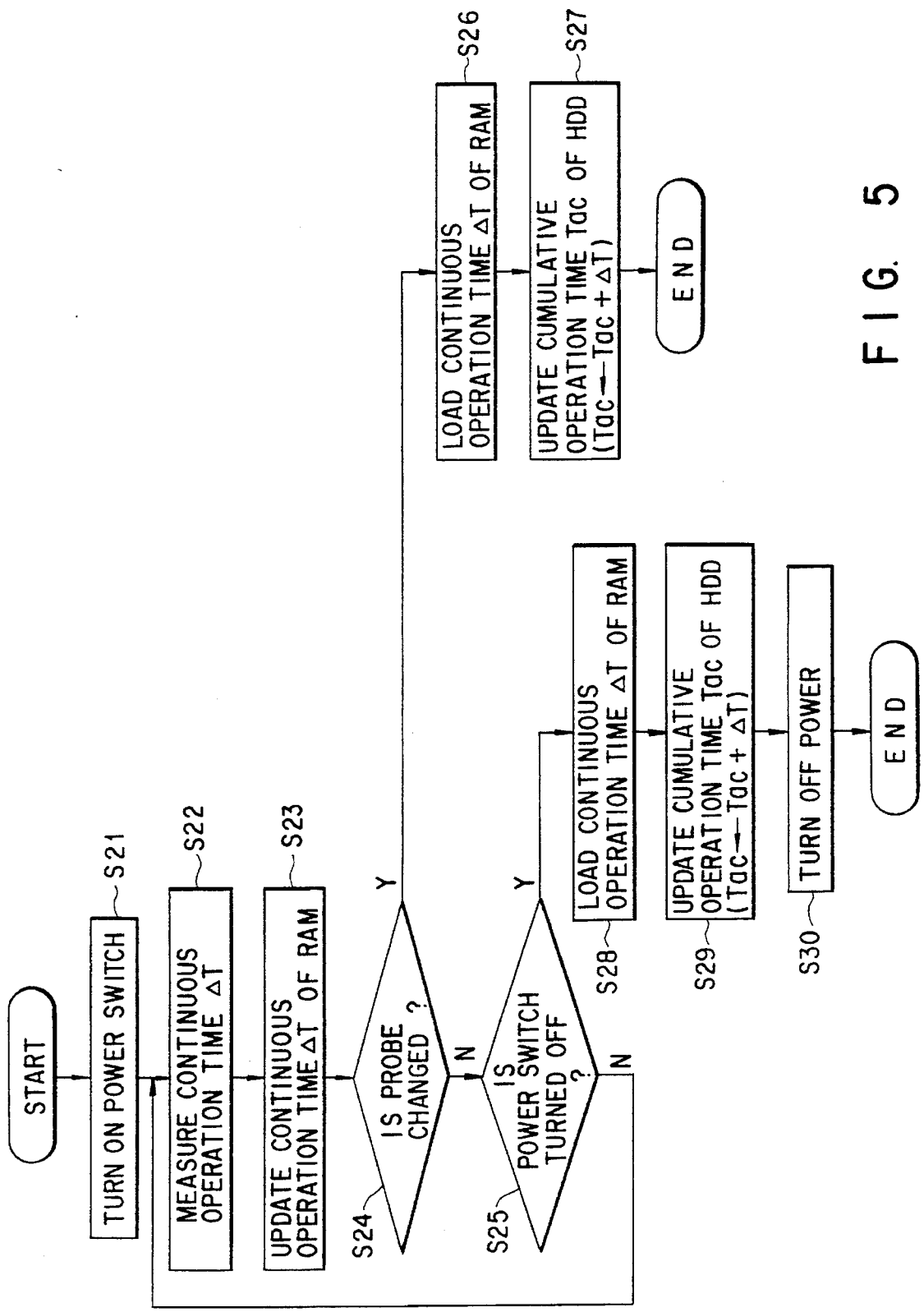
FIG. 5 is a flow chart showing an updating operation for a cumulative operation time in the second embodiment.
Figure 6:
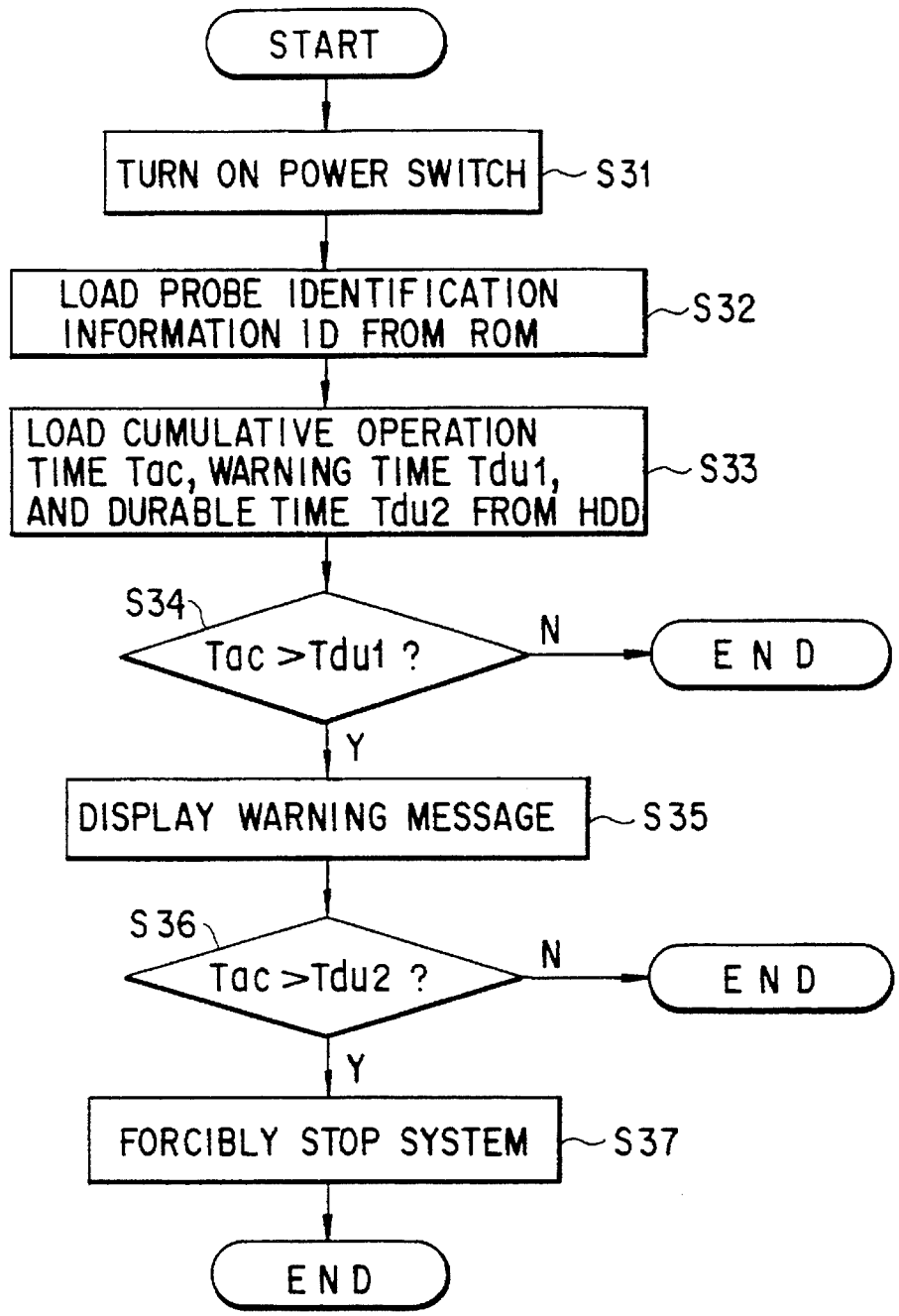
FIG. 6 is a flow chart showing an operation time monitoring operation in the second embodiment.

The operation for the second embodiment will be described below. FIG. 5 is a flow chart showing an operation of updating the cumulative operation time Tac according to the second embodiment, and FIG. 6 is a flow chart showing an operation of monitoring operation time of a probe according to the second embodiment.

An updating operation for the cumulative operation time Tac will be described below. In step S21, the main power switch of the ultrasonic diagnostic apparatus is turned on by a serviceman. In step S22, the probe operation time monitoring unit 25 measures a continuous operation time ΔT through the timer 26. The continuous operation time ΔT is measured by the same method as that of the first embodiment described above.

The continuous operation time ΔT from the measurement start time of the continuous operation time ΔT to the current time is measured and written in the RAM 34 at any time (step S23). Assume that a continuous energizing operation is ended, that a mode is switched, or that another probe is selected, i.e., the measurement of the continuous operation time ΔT is ended. At this time, the latest continuous operation time ΔT written in the RAM 34 is loaded into the probe operation time monitoring unit 25. In addition, the cumulative operation time Tac corresponding to the corresponding probe 2, 3, or 4 is loaded from the hard disk drive 27 into the probe operation time monitoring unit 25. The continuous operation time ΔT is added to the cumulative operation time Tac by the probe operation time monitoring unit 25, and this sum is supplied and written in the hard disk drive 27 as a new cumulative operation time Tac. In this manner, the cumulative operation time Tac in the hard disk drive 27 is updated.

While the continuous operation time ΔT is measured, when the probe 2, 3, or 4 in operation is unexpectedly changed to another probe, YES is determined in step S24, steps S26 and S27 are sequentially executed, and the cumulative operation time Tac in the hard disk drive 27 is updated in the same manner as described above.

While the continuous operation time ΔT is measured, when the main power switch of the ultrasonic diagnostic apparatus is unexpectedly turned off, YES is determined in step S25, and steps S28, S29, and S30 are sequentially executed, the cumulative operation time Tac in the hard disk drive 27 is updated in the same manner as described above, and the main power is off.

An operation of monitoring operation time of a probe will be described below with reference to FIG. 6. In step S31, the main power switch of the ultrasonic diagnostic apparatus is turned on by a serviceman. In step S32, the probe identification information ID from the ROM 31, 32, or 33 corresponding to the probe 2, 3, or 4 selected through a probe selection switch 23 is loaded into the probe operation time monitoring unit 25.

In step S33, the cumulative operation time Tac, warning time Tdu1, and durable time Tdu2 corresponding to the probe 2, 3, or 4 selected through the probe selection switch 23 are loaded from the hard disk drive 27 into the probe operation time monitoring unit 25.

In step S34, the probe operation time monitoring unit 25 compares the cumulative operation time Tac with the warning time Tdu1. When the cumulative operation time Tac is shorter than the warning time Tdu1, the operation time monitoring operation is ended. When the cumulative operation time Tac exceeds the warning time Tdu1, data indicating that the cumulative operation time Tac is equal to the warning time Tdu1 is output from the probe operation time monitoring unit 25 to a system controller 20 in step S35. In this manner, a warning message is displayed on the display unit 19.

In step S36, the probe operation time monitoring unit 25 compares the cumulative operation time Tac with the durable time Tdu2. When the cumulative operation time Tac is shorter than the durable time Tdu2, the operation time monitoring operation is ended. When the cumulative operation time Tac is equal to the durable time Tdu2, data indicating that the cumulative operation time Tac is equal to the durable time Tdu2 is output from the probe operation time monitoring unit 25 to the system controller 20. In this manner, in step S37, the system controller 20 forcibly stops the operation of the ultrasonic diagnostic apparatus.

As described above, according to this embodiment, unlike the first embodiment, an accumulated energizing time is not stored in a probe connector, and the cumulation energizing time is stored in the hard disk drive in the apparatus main body in correspondence with probe identification information, thereby obtaining the same effect as described in the first embodiment.

Third Embodiment

FIG. 7 shows a block diagram showing the arrangement of the third embodiment. The same reference numerals as in FIG. 4 denote the same parts in FIG. 7, and a detailed description thereof will be omitted. This embodiment is different from the first embodiment in only the following point. That is, when a main power supply is set in an OFF state, a continuous operation time ΔT is stored until the main power switch is turned on next time. A cumulative operation time in the EEPROM of a probe connector is updated when the main power switch is turned on next time.

For this reason, according to this embodiment, durable times Tdu2 and warning times Tdu1 respectively inherent in probes 2, 3, and 4 are stored in a hard disk drive 27 in correspondence with pieces of probe identification information ID of the probes 2, 3, and 4 in advance. Continuous operation times ΔT measured by a probe operation time monitoring unit 25 are stored in the hard disk drive 27 in correspondence with the pieces of probe identification information ID.

Figure 9:
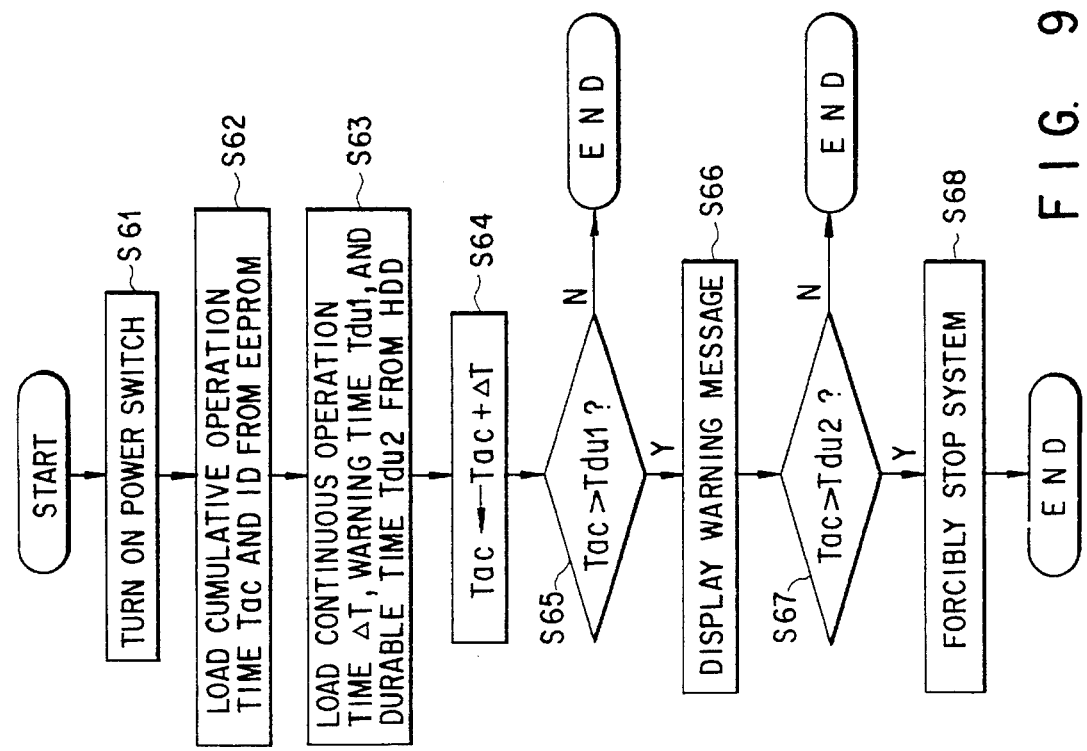
FIG. 9 is a flow chart showing an operation time monitoring operation in the third embodiment.

The operation of this embodiment will be described below with reference to the flow charts shown in FIGS. 8A to 8C, and 9. FIGS. 8A to 8C are flow charts showing an operation of updating a cumulative operation time Tac according to the third embodiment, and FIG. 9 is a flow chart showing an operation of monitoring operation time of a probe according to the third embodiment.

An updating operation for the cumulative operation time Tac will be described below. In step S41, the main power switch of the ultrasonic diagnostic apparatus is turned on by a serviceman. In step S42, the cumulative operation time Tac and the probe identification information ID from the EEPROM 14, 15, or 16 corresponding to the probe 2, 3, or 4 selected through a probe selection switch 23 are loaded into the probe operation time monitoring unit 25. In step S43, the continuous operation time ΔT corresponding to the corresponding probe identification information ID is loaded form the hard disk drive 27 into the probe operation time monitoring unit 25.

In step S44, the cumulative operation time Tac stored in the EEPROM 14, 15, or 16 is updated.

In step S45, measurement of the continuous operation time ΔT is started by the probe operation time monitoring unit 25 through a timer 26. The detailed description of the measurement of the continuous operation time ΔT is the same as that of the first embodiment.

The continuous operation time ΔT from the measurement start time of the continuous operation time ΔT to the current time is measured and written in a RAM 34 at any time (step S46). Assume that a continuous energizing operation is ended, that a mode is switched, or that another probe is selected, i.e., the measurement of the continuous operation time ΔT is ended. At this time, the latest continuous operation time ΔT written in the RAM 34 is loaded into the probe operation time monitoring unit 25. This continuous operation time ΔT is stored in the hard disk drive 27 in correspondence with the probe identification information ID until the main power switch is turned on next time. When the main power switch is turned on next time, the cumulative operation time Tac stored in the EEPROM 14, 15, or 16 is updated in steps S41 to S44.

While the continuous operation time ΔT is measured, when the probe 2, 3, or 4 in operation is unexpectedly changed to another probe, YES is determined in step S47, steps S49 and S50 are sequentially executed, and the latest continuous operation time ΔT written in the RAM 34 is loaded into the probe operation time monitoring unit 25. This continuous operation time ΔT is stored in the hard disk drive 27 in correspondence with the probe identification information ID until the main power switch is turned on next time.

While the continuous operation time ΔT is measured, when the main power switch of the ultrasonic diagnostic apparatus is unexpectedly turned off, YES is determined in step S48, and steps S51, S52, and S53 are sequentially executed. That is, the latest continuous operation time ΔT written in the RAM 34 is loaded into the probe operation time monitoring unit 25, this continuous operation time ΔT is stored in the hard disk drive 27 in correspondence with the probe identification information ID until the main power switch is turned on next time, and the main power is off.

An operation of monitoring operation time of a probe will be described below with reference to FIG. 9. In step S61, the main power switch of the ultrasonic diagnostic apparatus is turned on by a user. In step S62, the cumulative operation time Tac and probe identification information ID from the EEPROM 14, 15, or 16 corresponding to the probe 2, 3, or 4 selected through the probe selection switch 23 are loaded into the probe operation time monitoring unit 25.

In step S63, the warning time Tdu1, the durable time Tdu2, and the continuous operation time ΔT corresponding to the probe identification information ID are loaded from the hard disk drive 27 into the probe operation time monitoring unit 25.

In step S64, the cumulative operation time Tac of the EEPROM 14, 15, or 16 is updated by the probe operation time monitoring unit 25 on the basis of the continuous operation time ΔT.

In step S65, the probe operation time monitoring unit 25 compares the updated cumulative operation time Tac with a corresponding warning time Tdu1. When the cumulative operation time Tac is shorter than the warning time Tdu1, the probe operation time monitoring unit 25 ends the probe operation time monitoring operation.

When the cumulative operation time Tac is equal to the warning time Tdu1, data indicating that the cumulative operation time Tac is equal to the warning time Tdu1 is output from the probe operation time monitoring unit 25 to the system controller 20, and a warning message is output in step S66.

In step S67, the probe operation time monitoring unit 25 compares the cumulative operation time Tac with the durable time Tdu2. When the cumulative operation time Tac is shorter than the durable time Tdu2, the probe operation time monitoring unit 25 ends the probe operation time monitoring operation. When the cumulative operation time Tac is equal to the warning time Tdu1, data indicating that the cumulative operation time Tac is equal to the durable time Tdu2 is output from the probe operation time monitoring unit 25 to the system controller 20, and the operation of the ultrasonic diagnostic apparatus is forcibly stopped by the system controller 20 in step S68.

As described above, according to this embodiment, the same effect as described in each of the above embodiments described above can be obtained.

Fourth Embodiment

Figure 10:
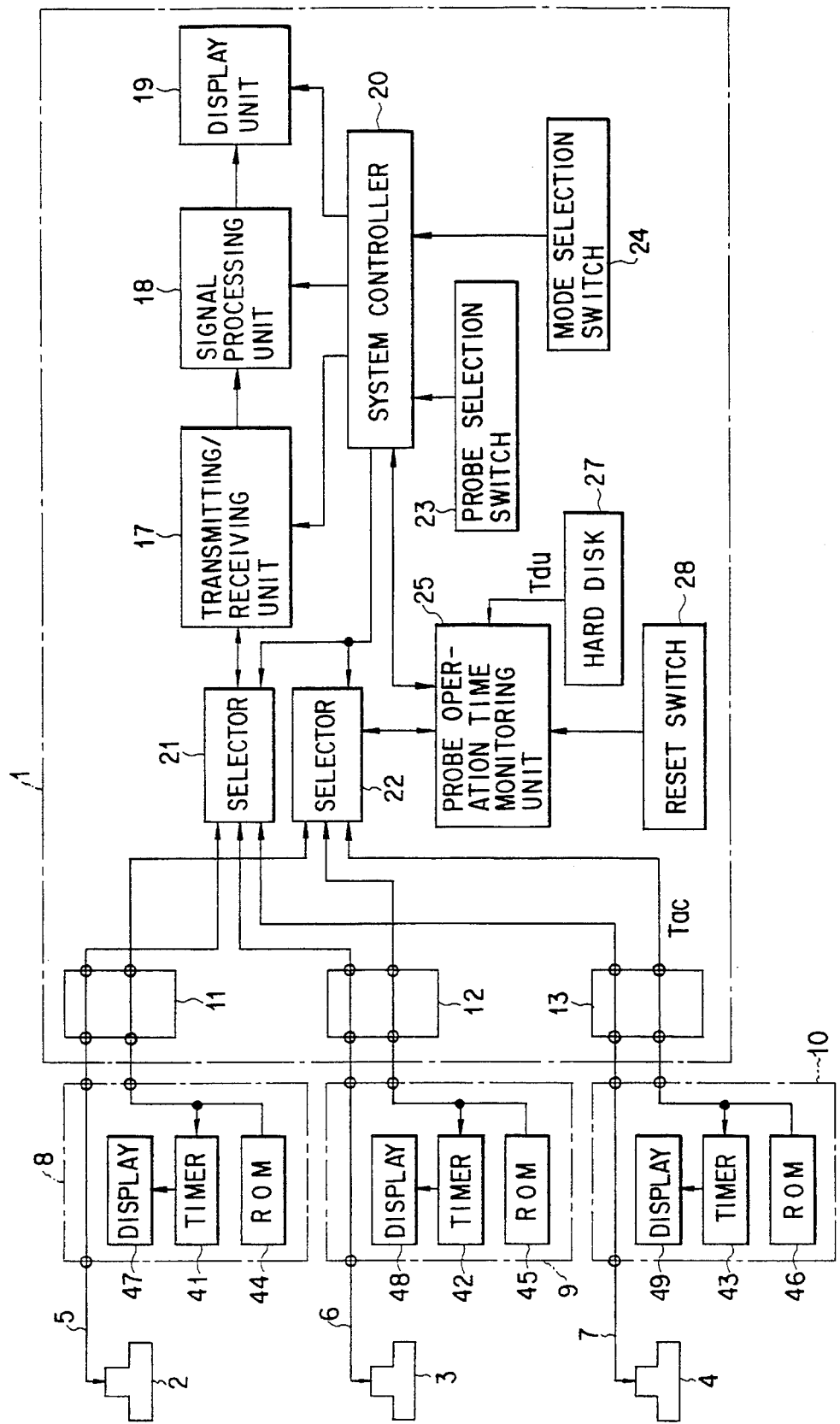
FIG. 10 is a block diagram showing the arrangement of an ultrasonic diagnostic apparatus according to the fourth embodiment of the present invention.

FIG. 10 is a block diagram showing the arrangement of the fourth embodiment. The same reference numerals as in FIG. 1 denote the same parts in FIG. 10, and a detailed description thereof will be omitted. According to this embodiment, timers 41, 42, and 43, ROMs 44, 45, and 46, and displays 47, 48, and 49 are incorporated in probe connectors 8, 9, and 10, respectively. Each of the timers 41, 42, and 43 intermittently measures a lapse of time like a stopwatch, and is set in an operation time only while a corresponding one of probes 2, 3, and 4 is used to measure an operation time. Upon completion of use of the corresponding one of the probes 2, 3, and 4, the corresponding timer stores the measured operation time. When use of the corresponding probe 2, 3, or 4 is started next, the timer cumulatively measures an operation time using the stored operation time as an initial value. The start and stop operations of the timers 41, 42, and 43 are controlled by a probe operation time monitoring unit 25. The displays 47, 48, and 49 are digital displays each having a plurality of digits and digitally display the operation times measured by the timers 41, 42, and 43, respectively. Pieces of probe identification information ID inherent in the probes 2, 3, and 4 are stored in the ROMs 44, 45, and 46, respectively. The displays 47, 48, and 49 may receive drive power from an apparatus main body 1 or power supplies (batteries) arranged in the probe connectors 8, 9, and 10.

Durable times Tdu2 and warning times Tdu1 respectively inherent in the probes 2, 3, and 4 are stored in a hard disk drive 27 in correspondence with the pieces of probe identification information ID.

The operation of this embodiment will be described below. A measuring operation for a cumulative operation time Tac will be described first. The cumulative operation time Tac is measured by repetitively starting and stopping the timer 41, 42, or 43. The timer 41, 42, or 43 is started and stopped under the control of the probe operation time monitoring unit 25. The probe operation time monitoring unit 25 starts the timer 41, 42, or 43 when the probe 2, 3, or 4 selected by a probe selection switch 23 is started by a transmitting/receiving unit 17 or when the probe identification information ID is loaded from the ROM 44, 45, or 46 of the probe 2, 3, or 4 selected by the probe selection switch 23. In addition, the probe operation time monitoring unit 25 stops the timer 41, 42, or 43 when the probe 2, 3, or 4 selected by the probe selection switch 23 is stopped by the transmitting/receiving unit 17 or when another probe is selected through the probe selection switch 23.

The cumulative operation times Tac measured by the timers 41, 42, and 43 are digitally displayed on the displays 47, 48, and 49 in real time, respectively.

Figure 11:
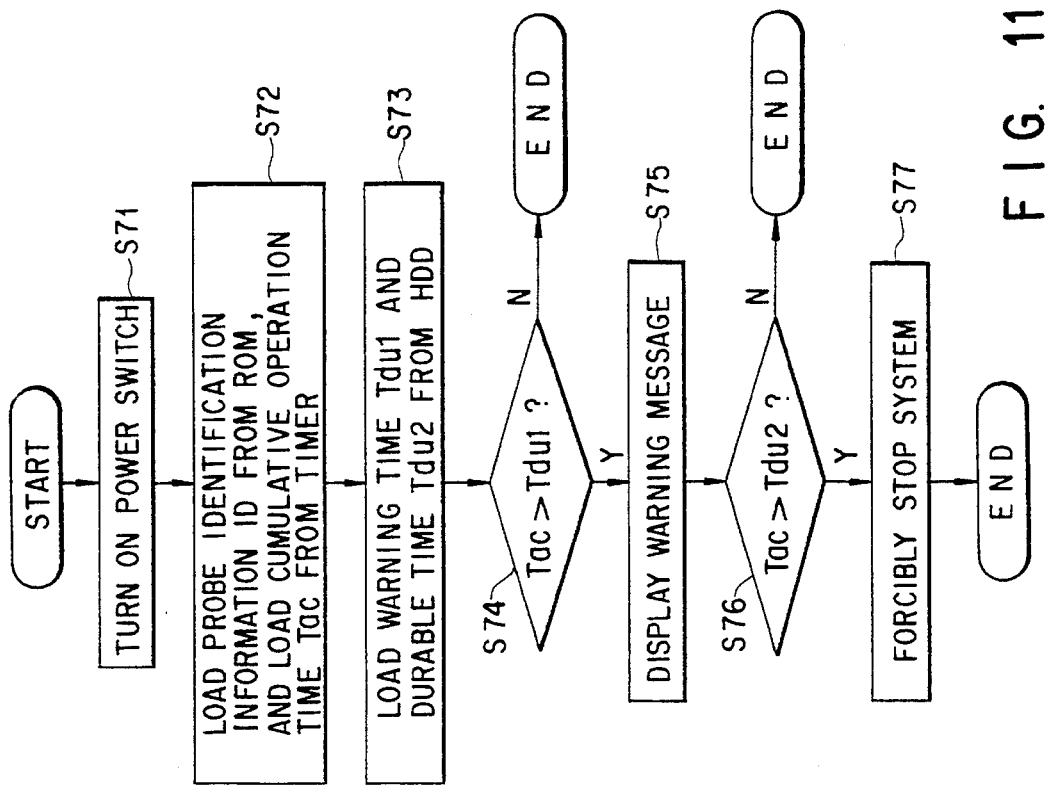
FIG. 11 is a flow chart showing an operation time monitoring operation in the fourth embodiment.

An operation of monitoring operation time of a probe according to the fourth embodiment will be described below with reference to FIG. 11. In step S71, the main power switch of the ultrasonic diagnostic apparatus is turned on by a serviceman. In step S72, the cumulative operation time Tac stored in the timer 41, 42, or 43 corresponding to the probe 2, 3, or 4 selected through the probe selection switch 23 and the probe identification information ID stored in the ROM 44, 45, or 46 are loaded into the probe operation time monitoring unit 25.

In step S73, the warning time Tdu1 and durable time Tdu2 corresponding to the probe identification information ID are loaded from the hard disk drive 27 into the probe operation time monitoring unit 25.

In step S74, the probe operation time monitoring unit 25 compares the cumulative operation time Tac with the warning time Tdu1. When the cumulative operation time Tac is shorter than the warning time Tdu1, the probe operation time monitoring unit 25 ends the operation time monitoring operation.

When the cumulative operation time Tac is equal to the warning time Tdu1, data indicating that the cumulative operation time Tac is equal to the warning time Tdu1 is output from the probe operation time monitoring unit 25 to a system controller 20, and a warning message is output in step S75.

In step S76, the probe operation time monitoring unit 25 compares the cumulative operation time Tac with the durable time Tdu2. When the cumulative operation time Tac is shorter than the durable time Tdu2, the probe operation time monitoring unit 25 ends the operation time monitoring operation. When the cumulative operation time Tac is equal to the durable time Tdu2, data indicating that the cumulative operation time Tac is equal to the durable time Tdu2 is output from the probe operation time monitoring unit 25 to the system controller 20, and the system controller 20 forcibly stops the operation of the ultrasonic diagnostic apparatus in step S68.

As described above, according to this embodiment, the same effect as described in each of the embodiments described above can be obtained.

Fifth Embodiment

Figure 12:
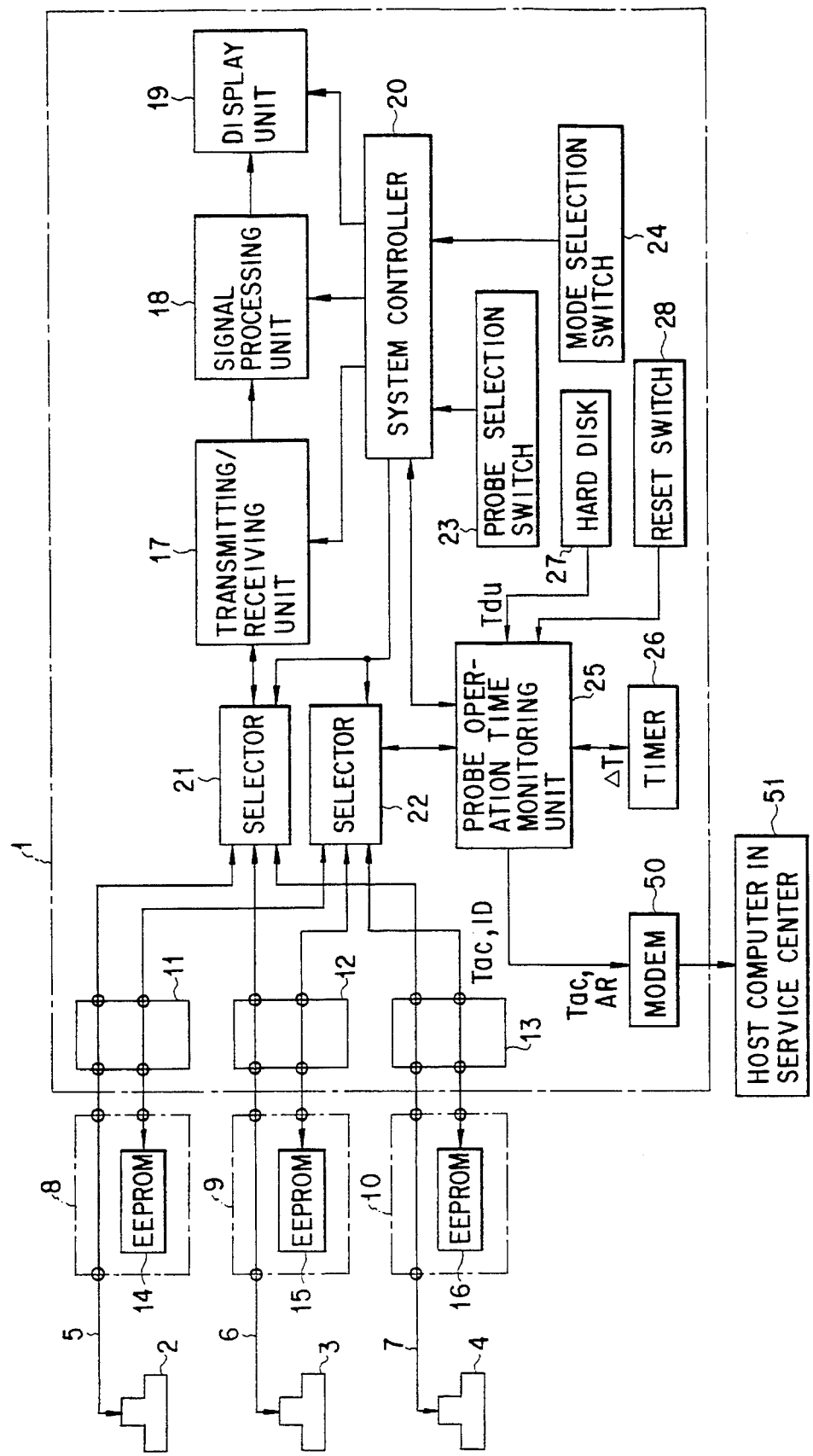
FIG. 12 is a block diagram showing the arrangement of an ultrasonic diagnostic apparatus according to the fifth embodiment of the present invention.

FIG. 12 is a block diagram showing the arrangement of the fifth embodiment. The same reference numerals as in FIG. 1 denote the same parts in FIG. 12, and a detailed description thereof will be omitted. The fifth embodiment has the following characteristic feature. That is, a cumulative operation time Tac measured by an apparatus main body 1 and alarm information AR are transmitted to a host computer 51 in an external service center through a modem 50. This alarm information AR is data indicating that the cumulative operation time Tac is equal to a warning time Tdu1 or that the cumulative operation time Tac is equal to a durable time Tdu2.

According to this embodiment, a serviceman staying in the service center can objectivity recognize operation time of probes at any time. Although a case wherein the fifth embodiment is applied to the first embodiment has been described, the fifth embodiment can be applied to any one of the second to fourth embodiments.

The present invention is not limited to the embodiments described above, and various modifications can be effected. For example, a log file in which the intermittent operation times of a probe are described in a time series manner is formed, and this log file may be stored in a hard disk drive. In addition, alarm information may be added to the operation times described in the log file. In this case, a serviceman can easily determine a probe whose operation time exceeds the durable time of the probe using the presence/absence of the alarm information, and the log file can be utilized for exact maintenance management in the future. Information of the departments of internal medicine, surgery, obstetrics and gynecology, and the like obtained by performing ultrasonic diagnoses may be added to each operation time described in the log file. In this case, the operation times can be recognized in units of departments, and the operation times can be utilized as standards used for sharing the expenses related to purchase of a new apparatus and maintenance of an apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An ultrasonic diagnostic apparatus for transmitting an ultrasonic wave to an object to be examined and causing an apparatus main body to form an image of tomographic information in the object obtained through an ultrasonic probe for receiving a wave reflected by the body, comprising:

storage means for storing a cumulative operation time of said ultrasonic probe;

probe operation time monitoring means for measuring a continuous operation time of said ultrasonic probe, and adding the measured continuous operation time to the cumulative operation time stored in said storage means to update the cumulative operation time stored in said storage means; and output means for outputting the cumulative operation time updated by said probe operation time monitoring means.

2. An apparatus according to claim 1, in which said probe operation time monitoring means compares the updated comulative operation time with a predetermined durable time, said output means output a comparison result obtained by said probe operation time monitoring means.

3. An apparatus according to claim 1, in which said probe operation time monitoring means measures a continuous energizing time of said ultrasonic probe as the continuous operation time.

4. An apparatus according to claim 1, in which said ultrasonic probe is detachably connected to said apparatus main body through a probe connector connected to said ultrasonic probe through a cable, and said storage means is incorporated in said probe connector.

5. An apparatus according to claim 4, in which said storage means is an electrically erasable programmable nonvolatile semiconductor memory.

6. An apparatus according to claim 4, in which said storage means is a RAM having a power supply.

7. An apparatus according to claim 1, in which said ultrasonic probe is detachably connected to said apparatus main body through a probe connector connected to said ultrasonic probe through a cable, and a nonvolatile memory in which identification information for identifying said ultrasonic probe is stored is incorporated in said probe connector;

said storage means is arranged in said apparatus main body to store the cumulative operation time in accordance with the identification information; and said probe operation time monitoring means loads identification information from said nonvolatile memory and selectively loads a cumulative operation time corresponding to the loaded identification information from said storage means to update the cumulative operation time.

8. An apparatus according to claim 7, in which said storage means is a magnetic disk device.

9. An apparatus according to claim 7, in which said nonvolatile memory is a ROM.

10. An apparatus according to claim 1, in which said probe operation time monitoring means compares the updated cumulative operation time with a warning time shorter than the durable time, said output means output a comparison result of the updated comulative operation time and the warning time.

11. An apparatus according to claim 1, in which said probe operation monitoring means forcibly stops an operation of said apparatus main body when the updated cumulative operation time exceeds the durable time.

12. An ultrasonic diagnostic apparatus comprising:

an ultrasonic probe for transmitting an ultrasonic wave to an object to be examined and receiving a wave reflected by the object;

an apparatus main body for forming an image of tomographic information in the object obtained through said ultrasonic probe; and a probe connector connected to said ultrasonic probe through a cable and detachably connected to said apparatus main body, wherein said probe connector has a timer and display means, said timer being set in an operative time when said ultrasonic probe is used to measure an operation time, storing a measurement result when said ultrasonic probe is not used, and measuring an operation time using the stored measurement time as an initial value when said ultrasonic probe is used next, and said display means displaying the operation time measured by said timer.

13. An apparatus according to claim 12, in which said apparatus main body has probe operation time monitoring means and output means, said monitoring means comparing the operation time measured by said timer with a predetermined durable time, said output means outputting a comparison result obtained by said monitoring means.

14. An apparatus according to claim 13, in which said monitoring means compares the operation time measured by said timer with a warning time shorter than the durable time, said output means output a comparison result of the operation time and the warning time.

15. An apparatus according to claim 12, in which said operation time is an energizing time of said ultrasonic probe.

* * * * *